United States Patent
Hansen

(10) Patent No.: US 9,686,313 B2
(45) Date of Patent: *Jun. 20, 2017

(54) CLICKJACKING PROTECTION

(71) Applicant: Robert Hansen, Austin, TX (US)

(72) Inventor: Robert Hansen, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,862

(22) Filed: Apr. 17, 2014

(65) Prior Publication Data

US 2014/0230056 A1    Aug. 14, 2014

Related U.S. Application Data

(63) Continuation of application No. 13/742,233, filed on Jan. 15, 2013, now Pat. No. 8,726,381.

(51) Int. Cl.
| | | |
|---|---|---|
| *H04L 29/06* | (2006.01) | |
| *G06F 21/50* | (2013.01) | |
| *G06F 21/55* | (2013.01) | |
| *G06F 21/64* | (2013.01) | |

(52) U.S. Cl.
CPC .......... *H04L 63/1466* (2013.01); *G06F 21/50* (2013.01); *G06F 21/554* (2013.01); *G06F 21/64* (2013.01); *H04L 63/1441* (2013.01); *G06F 2221/2119* (2013.01)

(58) Field of Classification Search
None
See application file for complete search history.

(56) References Cited

U.S. PATENT DOCUMENTS

| | | | | |
|---|---|---|---|---|
| 8,984,640 B1* | 3/2015 | Emigh | ................ | H04L 63/1441 726/13 |
| 2009/0037976 A1* | 2/2009 | Teo | ........................ | G06F 21/566 726/1 |
| 2010/0251371 A1* | 9/2010 | Brown | ............................ | 726/23 |
| 2011/0030058 A1* | 2/2011 | Ben-Itzhak | ............. | G06F 21/51 726/24 |
| 2011/0087648 A1* | 4/2011 | Wang | ...................... | G06F 21/56 707/709 |
| 2011/0320508 A1* | 12/2011 | Naito | .................. | G06F 17/3012 707/827 |
| 2012/0311669 A1* | 12/2012 | Akase | ................... | H04L 63/083 726/3 |
| 2015/0288714 A1* | 10/2015 | Emigh | ................... | H04B 1/667 726/22 |

OTHER PUBLICATIONS

Balduzzi, Marco Egele, Manuel Kirda, Engin Balzarotti, Davide Kruegel, Christopher; A Solution for the Automated Detection of Clickjacking Attacks; Apr. 13-16, 2010; ACM; pp. 1-8.*

* cited by examiner

*Primary Examiner* — Malcolm Cribbs
(74) *Attorney, Agent, or Firm* — Mark R. Hennings

(57) ABSTRACT

A clickjacking protector in an electronic system helps prevent unwanted clickjacking. The elements clicked on by the click position are evaluated to determine whether any of the elements clicked on by the click position is obscured (including being transparent or partially transparent). A protective action is generated in response to a determination that an element clicked on by the click position is obscured.

16 Claims, 5 Drawing Sheets

CLICKJACKING PROTECTION

BACKGROUND

Network-enabled applications are applications that use communication networks to share information between various devices, each of which might be operated by the same or different user. The network-enabled applications include applications such as browser engines, messaging interfaces, e-mail tools, remote desktops, and the like that allow users to easily browse, select, and manipulate items being viewed using a network-enabled application. The network-enabled application receives one or more communications (such as code for instantiating webpages) from a service provider that is often encoded in the form of a language (such as the hypertext markup language HTML), which describes the structure and functionality of the content that is received by the content user.

The communication (such as a received webpage) often includes information that is rendered using a graphics engine and displayed in the context of a graphics user interface (such as a windowed interface). Often, a cursor is used by the user to click on form submission boxes and hyperlinks of the displayed a graphics user interface. The cursor is normally implemented using a graphics object (such as a sprite) that is displayed as a top level display object. Thus the cursor appears to float over lower portions (e.g., layers) of the graphics interface as the cursor is moved across the display in response to user input commands (received from a mouse or trackball, for example).

However, malicious code that might be present in the network-enabled application (and/or computer upon which the network-enabled application is executing) can exploit the floating of the cursor over lower level objects by hiding a relatively small and/or transparent, yet clicked on element. For example, the malicious code can detect the position of the cursor. The malicious code is capable of positioning the hidden clicked on element anywhere on page, including being hovered over a button such as a play button.

When the user attempts to click a seemingly valid element (such as a hyperlink to a movie) by clicking on the seemingly valid element, for example, the hidden clicked on element misdirects the selection (click) signal generated by the user and performs any action that is allowed in response to a user selection (including actions unintended by the user). This exploit of misdirecting a user selection signal is often referred to as "clickjacking," a clickjacking attempt, user interface (UI) redress attack, or UI redressing. The malicious code can then exploit the misdirected user selection signal by, for example, referring to a link that is included in the hidden clicked on element ostensibly for the purpose of making (e.g., illegal or unfair) use of the exploited information.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

The term "domain" as used herein refers to either a domain or a portion of the domain ("subdomain") if any. Thus, the term "subdomain" can be used to refer to a portion of the "domain." A subdomain can be, for example, a domain name server (DNS) record. For example, the name "www.example.com" can be used in a localized context to refer to a domain (notwithstanding the fact that "www.example.com" is itself a subdomain of "example.com"). While net-enabled applications such as browsers follow a "same origin" policy and tend to use the longer version "www.example.com" as a domain name, the net-enabled applications also use the shorter version "example.com" for certain purposes (such as for cookies that are set with the domain switch). Thus all subdomains of the domain "a.com" include "no-subdomains" (such as "http://a.com/" and "http://whatever.a.com/") and include the more-specific subdomains (such as www.a.com).

Figure 1:
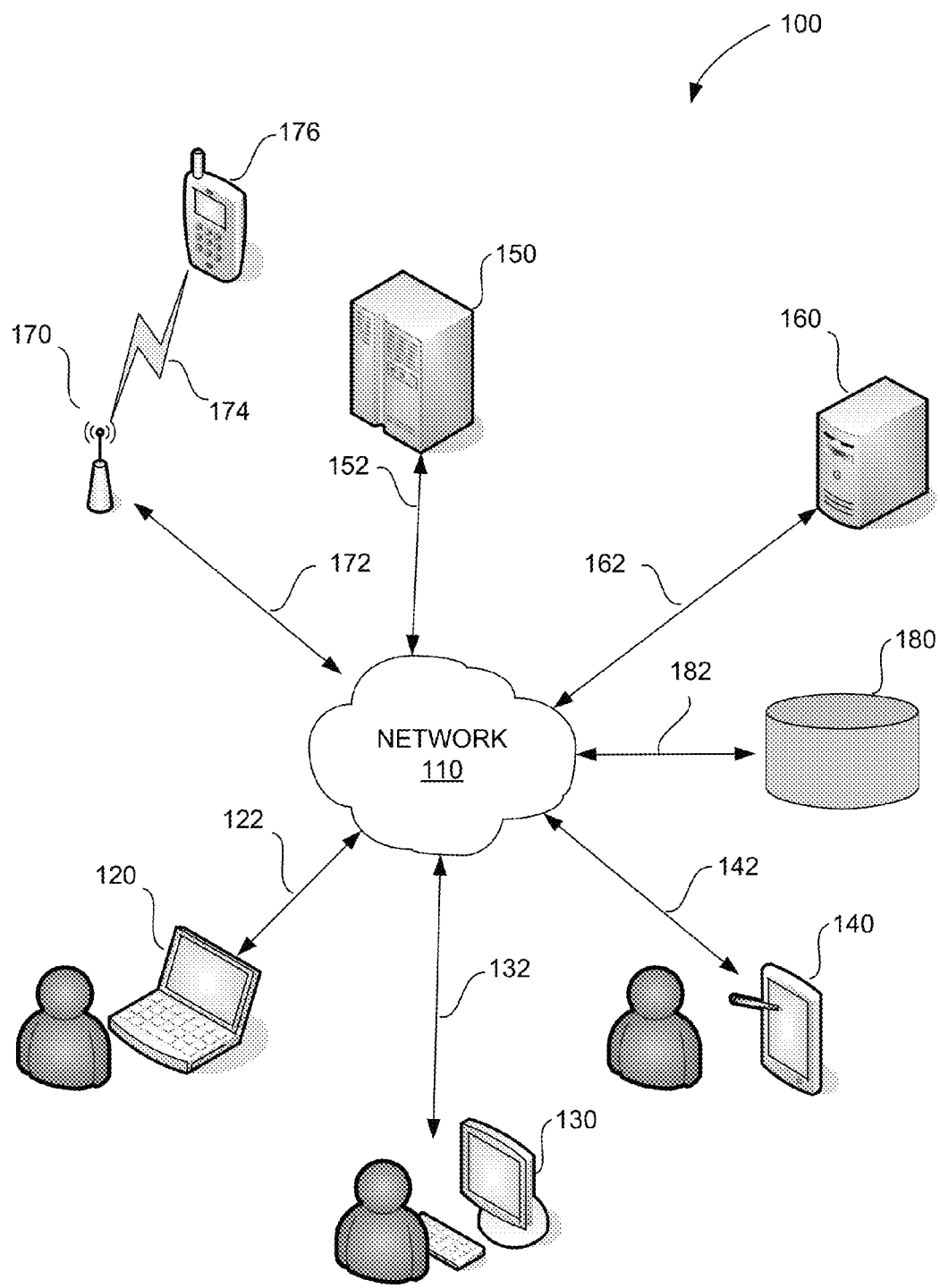
FIG. 1 is a network diagram illustrating a network that is suitable for practicing aspects of clickjacking protection in accordance with exemplary embodiments of the disclosure.

FIG. 1 is a network diagram illustrating a network that is suitable for practicing aspects of clickjacking protection in accordance with exemplary embodiments of the disclosure. Network system 100 includes consumer 120, 130, and 140 (machines, for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the internet, but other networks (including private networks) can be used. Thus, network 110 is typically a collection of networks (and gateways) that typically use a TCP/IP suite of protocols for packet-based communications. The internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked service providers of services such as service provider 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
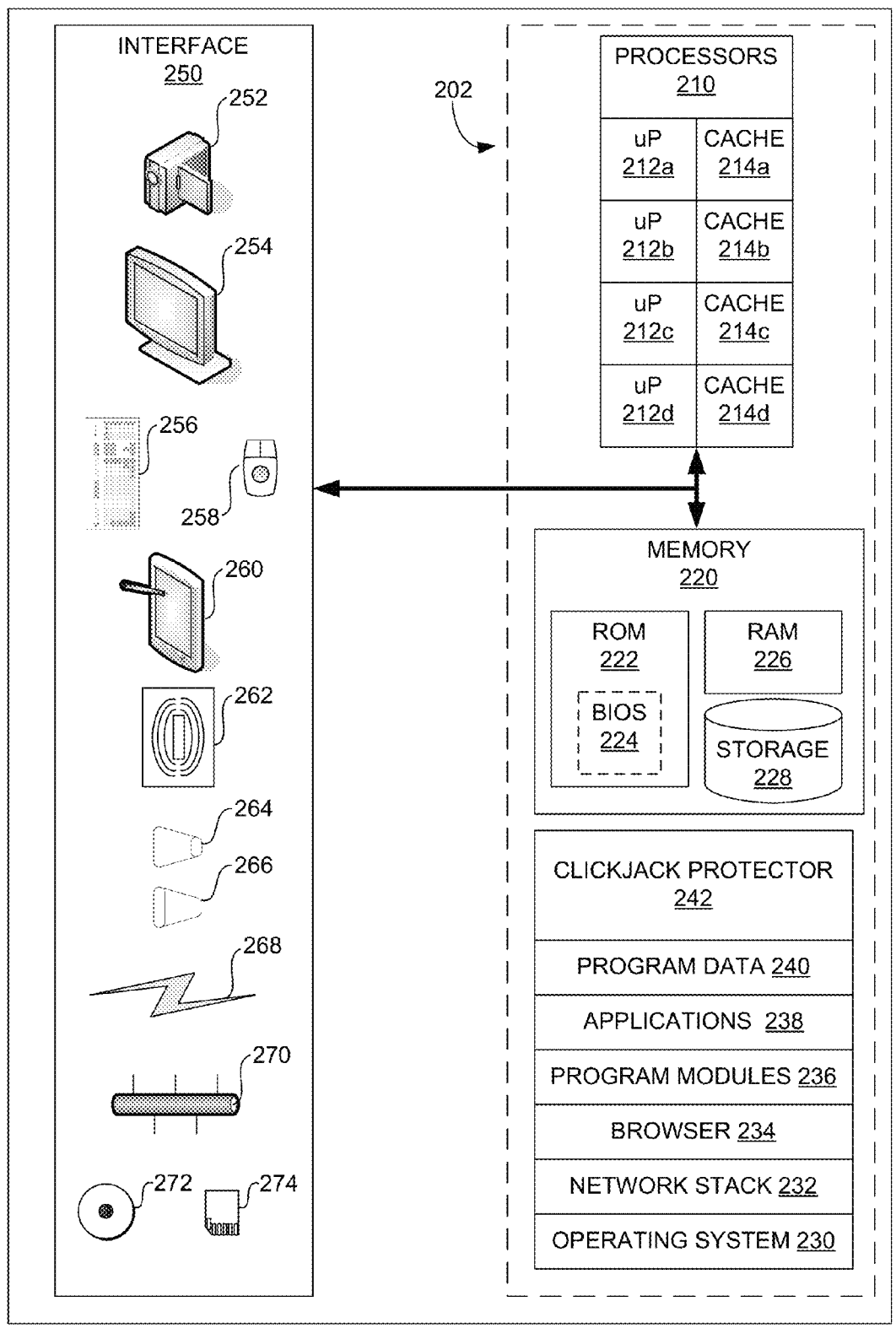
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212*a*, 212*b*, 212*c*, and 212*d*, each of which is optionally coupled to a respective, local cache 214*a*, 214*b*, 214*c*, and 214*d*. Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based drivers for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and clickjacking protector 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the clickjacking protector 242, for example.

Figure 3:
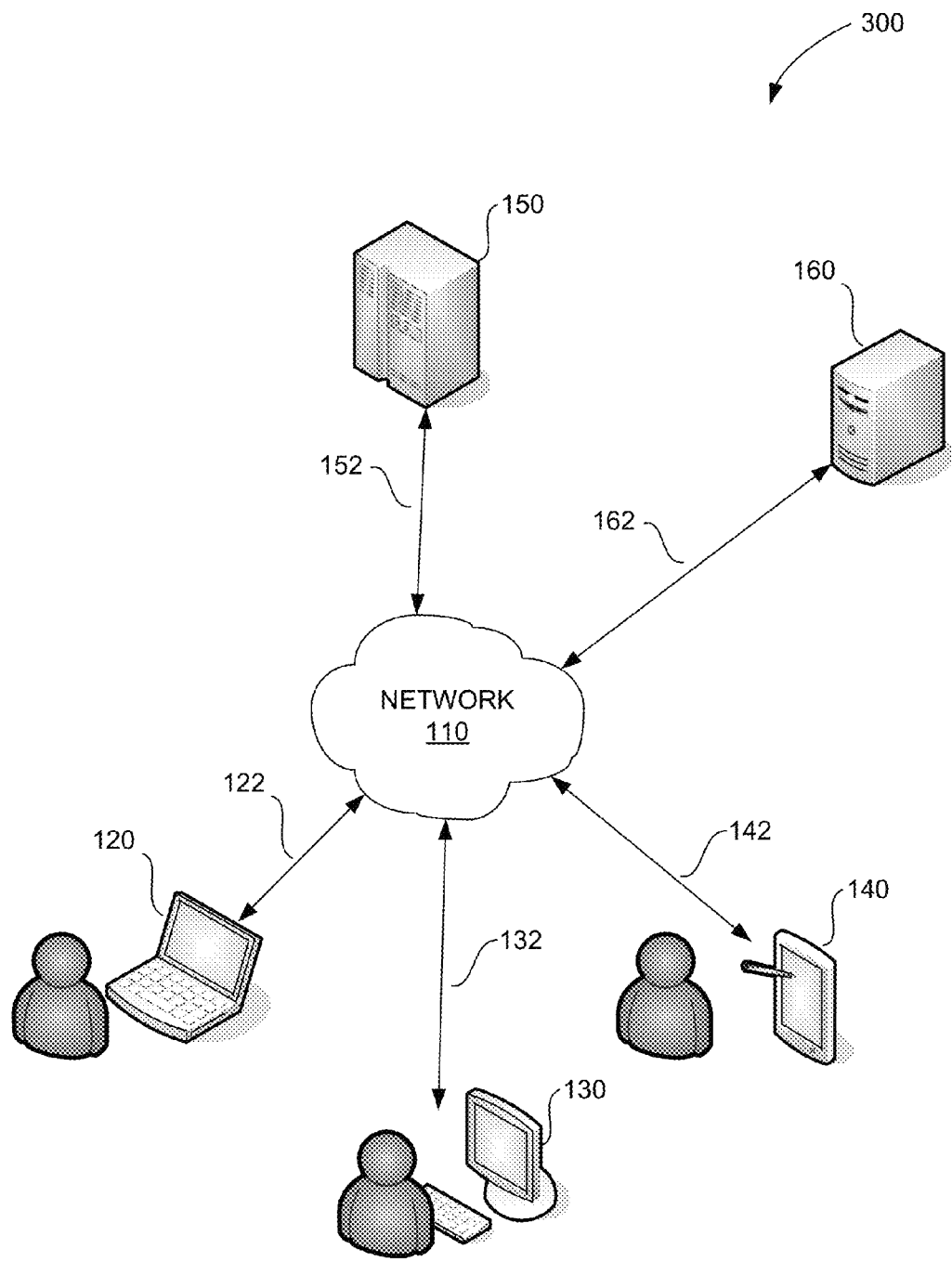
FIG. 3 is a network diagram illustrating a network that includes clickjacking protection in accordance with exemplary embodiments of the disclosure.

FIG. 3 is a network diagram illustrating a network that includes clickjacking protection in accordance with exemplary embodiments of the disclosure. Network system 300 includes service provider 150 and third party resource provider 160, as discussed above. Service provider 150 is arranged to provide networked content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160 (which is also a networked services provider).

Service provider 150 is a server (or a set of servers that are presented as a single server or a "virtual" server for processing requests). The consumers 120, 130, and 140 are typically clients with respect to the server (e.g., service provider 150). The consumers 120, 130, and 140 are, for example, personal computers or networked computers.

The clickjacking protector 242 of consumer 120 is arranged to reduce or prevent, for example, clickjackings. Clickjackings that misdirect a user selection signal over an obscured element are used to initiate unintended (e.g., by the user of consumer 120) communications to a third party resource provider 160. The clickjackings might possibly occur as a result of accessing a hacked webpage that the user did not intend when the user initiated the user selection signal (click). The clickjacking protector 242 is optionally arranged to initiate taking a protective action such as sending a warning signal and/or blocking the selection of an obscured malicious code element that is linked to a malicious code site at the time the user initiates a click signal (by activating a button on a pointing device such as a mouse, for example). The warning signal can be a warning signal that is used for internal (triggering) purposes or for purposes of conveying a warning to a user or an administrator of a third party resource provider 160 or other related website that sent the webpage having the malicious code element.

Figure 4:
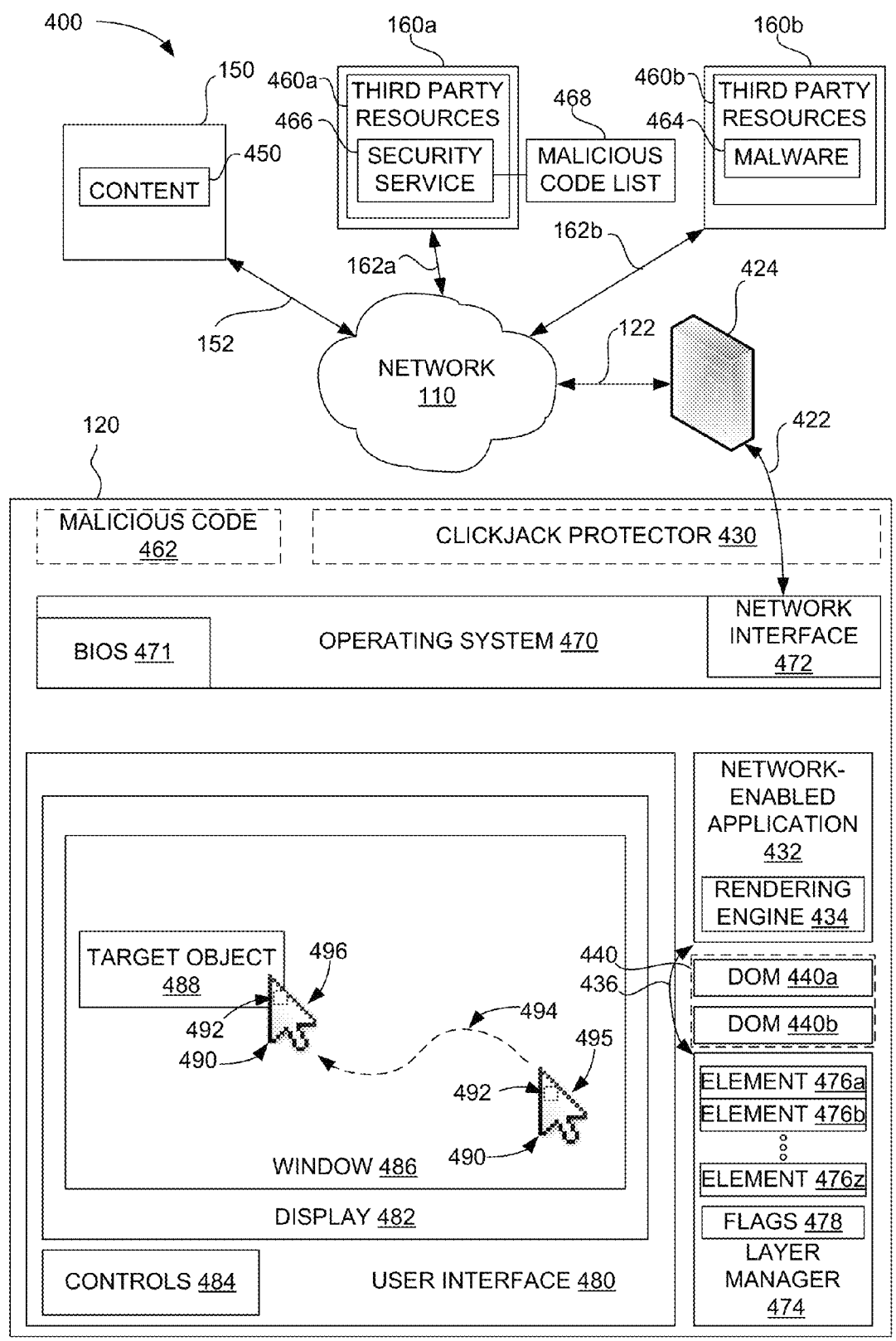
FIG. 4 is a logic diagram illustrating an clickjacking protector in accordance with exemplary embodiments of the disclosure.

FIG. 4 is a logic diagram illustrating a clickjacking protector in accordance with exemplary embodiments of the disclosure. Network system 400 includes, for example: consumer 120, service provider 150, and third party resource providers 160*a* and 160*b*. Consumer 120 is arranged to (more securely) communicate with network 110 using communication links 122, firewall 424, and communication link 422. Third party resource providers 160*a* and 160*b* are arranged to communicate with network 110 using communication links 162*a* and 162*b* respectively.

Consumer 120 typically includes a network-enabled application 432 that is arranged to conduct communications between service provider 150 and consumer 120. For example, network-enabled application 432 includes a standards-compliant browser such as Chrome, Firefox, Internet Explorer, and the like. A user enters a URL (universal resource locator) or IP (internet protocol) address to select content 450 (or a portion thereof) hosted by service provider 150. The selection is relayed by the browser via the network 110 to the addressed service provider (e.g., service provider 150) having the selected content.

Service provider 150 responds by sending a communication to the consumer 120. The communication is received by the network interface 472 of operating system 470 and the communication is passed to the network-enabled application 432 for decoding and, for example, rendering in the display 482.

The communication is often a webpage written in a markup language, although other formats can be used such as style sheets, JavaScript reference, and the like. The webpage often contains references to content provided by the service provider 150 as well as content provided by one or more third party resource providers 160. The references in the received communication are, for example, instantiated by a DOM (document object model) 440 as the network-enabled application 432 parses the received communication in accordance with the format used to encode the information encoded in the received communication.

As the network-enabled application 432 parses the received communication, the network-enabled application 432 constructs a DOM 440 (such as DOMs 440a and 440b) that delineates the structure and the function of the encoded information. The DOM 440 is arranged to load requested third party resources (such as third party resources 460a or 460b), for example, to be used to manage a window 486 of a webpage (conveyed by the encoded information) for display in the display 482 (typically via BIOS 471 of the operating system 470). The display 482 is used to provide visual indications to a user and to prompt the user for input. The user input is captured using controls 484 (such as by a keyboard and/or a mouse) of the user interface 480.

Window 486 is a (e.g., computer program) application window that is arranged to display program output and to help capture user input. Window 486 is, for example, a window of a network-enabled application 432 and includes a target element 488 that is arranged to be selected by a user using controls 484. The target element 488 is included in the received communication by the service provider 150 as a, for example, cross-domain element that is rendered by rendering engine 343 in accordance with DOM 440a, for example.

Cross-domain elements permit user selection signals (e.g., "clicks") to reference domains that are outside of the parent domain in which the window 486 was originated. Examples of cross-domain elements include advertising banners, "like" buttons, "digg" buttons, and the like, each of which initiates a cross-site reference that references the domain that is outside of a parent domain of the webpage in which the cross-domain elements are "framed in."

Many anti-CSRF (cross-site request forgery) protection mechanisms do not provide adequate protection against clickjacking because valid users are permitted to click on valid cross-domain websites (for example) using cross-domain elements. A normal defense against clickjacking is to use an X-Frame-Options HTTP (hypertext transfer protocol) response header. For example, X-Frame-Options protects against clickjacking by breaking the functionality of being included in a cross-domain request when the value for is set to "sameorigin." However, the X-Frame-Options HTTP response header being set to "sameorigin" fails to allow otherwise valid cross-domain requests (such as ad banners) to be honored when such cross-domain requests are included in the same webpage response.

Window 486 is arranged to display various elements included in the received communication by the service provider 150 using layers in which the various elements are rendered by the rendering engine 343. Layer manager 474 is arranged to maintain a list of elements 476a, 476b, . . . and 476z in accordance with information provided by a language standard used to render the received communications.

Layer manager 474 is also arranged to determine the order of the layers of the elements to determine, for example, the top layer (which is always displayed), intermediate layers (e.g., which might be hidden under an element in a higher layer), and lower layers (e.g., which might be partially or completely obscured by elements in higher layers). Layer manager 474 also provides flags 478 that are used to provide status of selected layers for determining, for example, what elements exist in the area in a click occurs, and whether those elements are visible or otherwise obscured when rendered.

As an example, malicious code 462 can install a malicious code element 492 (using DOM 440b, for example) in a layer that is beneath the layer of the cursor 490. The malicious code 462 typically can make the malicious code element 492 invisible and/or strategically size the malicious code element 492. The malicious code 462 can track the repositioning of the cursor (with reference to track 494, for example) and maintain the position of the malicious code element 492 so that the malicious code element 492 remains hidden from the user during the entire traversal of the cursor 490 from position 495 along track 494 to position 496.

When the user operating controls 484 moves the cursor 490 to position 496 with the intent of clicking on target element 488 (which might be a "baited" link so as to induce clicking upon the target element), the malicious code element is likewise positioned under the cursor 490. Thus, when the user seemingly clicks the target element 488, the user is effectively clicking upon the malicious code element 492 (which remains hidden from the user). The malicious code element 492 can also be obscured using techniques such as making the malicious code element 492 invisible and/or by rendering the malicious code element 492 as a partially off-browser window. The malicious code element 492 is often a cross-domain element that is encoded as an iframe element so that the user click of target element 488 is interpreted as a valid click of malicious code element 492 by the third party website.

To help prevent (and/or reduce) exploitation of by clickjacking by malicious code 462, the clickjacking protector 430 (which is a clickjacking protector such as clickjacking protector 242) takes a protective action such as preventing a transaction from being initiated using the malicious code element 492. The protective action can also include generating a warning signal that is used, for example, to reduce and/or prevent clickjacking by warning a user or the administrator of the third party website. The warning signal is generated by, for example, the layer manager 474.

In an exemplary embodiment, the network-enabled application notifies layer manager 474 (via signal bus 436) that a "click" command has been received from a user (via controls 484). The layer manager 474 determines a click position that is associated with the click command and identifies all elements that have controls that overlap the click position.

The layer manager 474 evaluates the elements that overlap the click position to determine whether any overlapped element is substantially obscured by the cursor 490. (Whether an element is substantially obscured can be determined by evaluating the likelihood that a novice human observer would not visually notice the obscured element). The layer manager 474 can use the rendering engine 434 to determine a metric for determining the degree to which a particular element is obscured. The layer manager can also use also use attributes of the obscured elements such as degree of transparency, location in an off-browser window being partially off of a displayed web page, overlays, and the like to determine whether the element is substantially obscured. The degree of transparency can range from an invisible value (where the element is completely invisible) to an opaque value (where the element blocks the view of any element directly below the element).

Upon a determination that the element is substantially obscured, the layer manager 474 takes a protective action such as generating a warning signal indicating that an obscured element has been clicked upon. The clickjacking protector 430 uses the warning signal to, for example, notify the user and/or administrator that an obscured element has been clicked upon. The clickjacking protector 430 can display a link referenced by the obscured element that was clicked on and query the user for permission to proceed before proceeding with the transaction implicated by the obscured element.

The clickjacking protector 430 can also use the warning signal to inform a security service 466 (such as hosted by a third party resource provider 160) that an obscured element has been clicked upon. The security service 466 can reference attributes of the obscured element (including the referred-to link) against a malicious code list 468 of known dangerous sites before proceeding with the transaction implicated by the obscured element. The security service 466 can probe the websites surrounding the referred-to link to determine the safety of the surrounding websites when the referred-to link does yet appear in the malicious code list 468.

The clickjacking protector 430 can also use the warning signal to block proceeding with any transaction implicated by the obscured element. Automatically blocking the click signal from initiating any code associated with the obscured element provides a higher degree of confidence that an unwanted action would occur as a result of clicking on an obscured element.

A selection of querying the user, accessing a security service (which can also be located on the consumer 120—including portions thereof), and blocking the click transaction associated with the clicked on obscured element can be made using a degree of visibility of the obscured element, the degree in confidence in the identification of the obscured element by the security service, the degree in confidence of the user, user settings, HTML settings, and the like.

In another example, the determination of which elements are obscured can be made as the webpage (for example) is initially rendered. When the cursor 490 is moved, the visibility of any changed element is evaluated to determine whether any element beneath the cursor 490 is (or has become) substantially obscured. When a click occurs that is focused upon a click position that implicates an obscured element, a warning signal is generated and the click signal can be blocked as described above.

In yet another example, the clickjacking protector 430 can monitor the visibility of any element that is a cross-site element (such as by using flags 478 to denote the elements 476 that are cross-site elements). If any of the flagged elements are obscured in any way, a warning signal is generated and the click signal can be blocked as described above. The monitoring of the visibility of any element can be controlled by, for example, a "verb" added to the X-Frame-Options standard (and/or a separate related standard) or by using a command programmed in HTML or JavaScript. The monitoring of the visibility of any element can be made in response to a timing event (such as a system timer or interrupt signal) or user-initiated actions (such as moving the cursor or clicking anywhere within a webpage).

Network-enabled applications (such as browser engines, messaging interfaces, e-mail tools, remote desktops, and the like) can access the clickjacking protector 430 by adding to and/or replacing functionality often provided by the operating system 470. For example, an HTTP header response in a received webpage can include a command that prohibits the response from being included by a cross-domain request when the received webpage includes a command that prohibits a cross-domain request from being included by any cross-domain site unless the response includes a command that indicates a (predetermined) cross-domain name is allowed to be included in a cross-domain request. Thus, the HTTP header response (such as a modified X-Frame-Options header response) can prohibit any cross-domain site from being included in a cross-domain request unless specifically permitted (e.g., by domain name or IP address) beforehand. Thus, the HTTP header response command allows subdomain or domains to be inclusive of whatever the HTTP header response allows to be framed.

The applications can operate (at least to a degree) independently of the operating system 470 (such as by monitoring the position of the cursor 490 relative to the position of cross-site elements). Accordingly, a browser application can operate in conjunction with (and/or incorporate features of) the clickjacking protector 430. For example, the clickjacking protector 430 can generate the warning signal in the window 486 itself, or as a URL (universal resource link) signal, a DNS (domain name server) signal, an HTTP (hypertext transfer protocol) header, or HTML (hypertext markup language) tag on the webpage itself.

Thus, the network-enabled application can use the warning signal to take an action (such as by blocking the transaction associated with the clicked on obscured element) without relying upon the operating system 470 to specifically provide the functionality to specifically taking action in response to the warning signal (such as by blocking the transaction associated with the clicked on obscured element).

Figure 5:
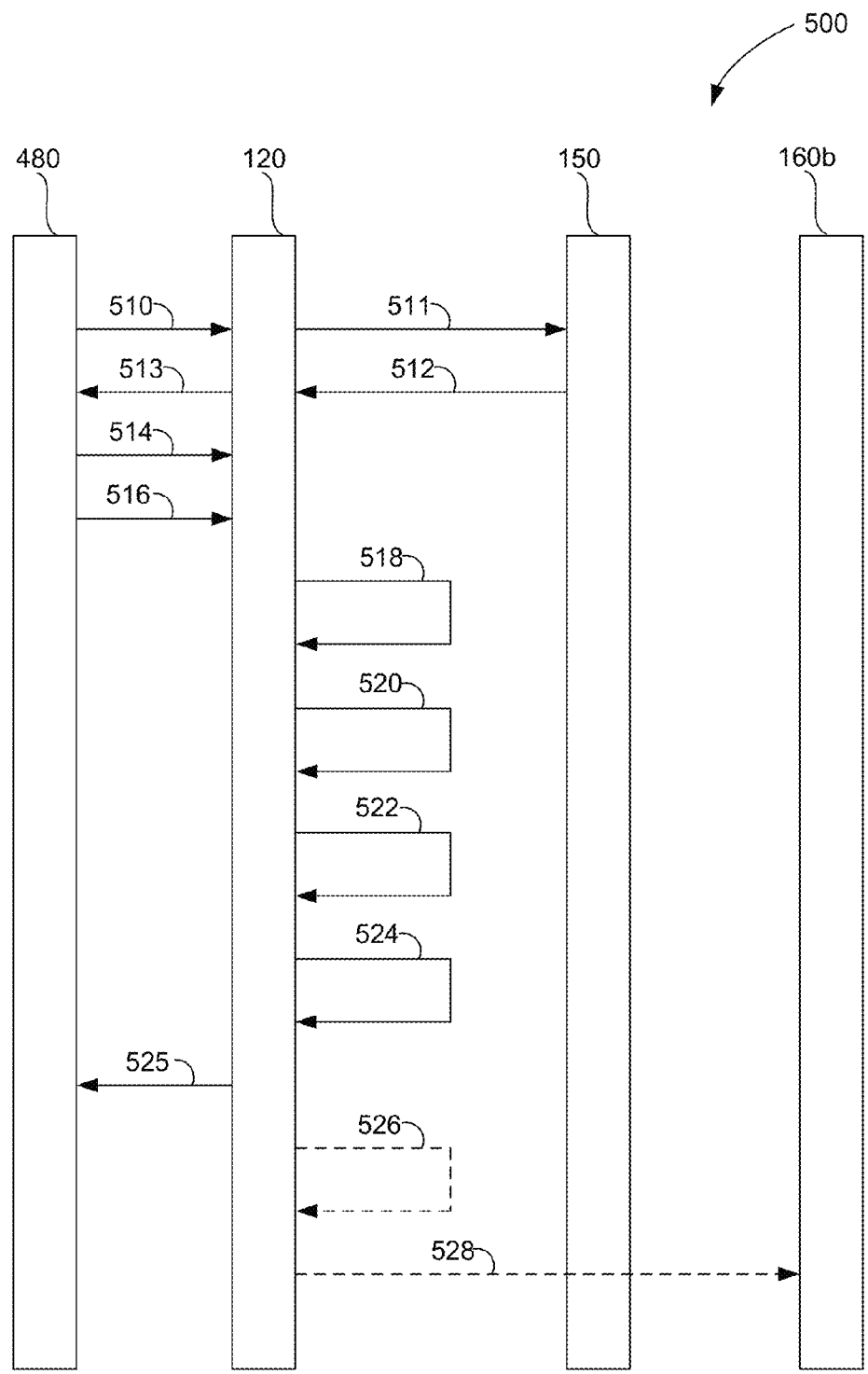
FIG. 5 is a signaling diagram illustrating in conjunction with FIG. 4 clickjacking protection in accordance with exemplary embodiments of the disclosure.

FIG. 5 is a signaling diagram illustrating in conjunction with FIG. 4 clickjacking protection in accordance with exemplary embodiments of the disclosure. Signaling diagram 500 illustrates communications transmitted and received between and amongst the user interface 480, for example, consumer 120, service provider 150, and third party resource provider 160. A user at user interface 480 sends a command 510 to consumer 120 for generating a request 511 for content (or other services) from service provider 150. In response, service provider 150 transmits a communication 512 via an external network wherein the communication 512 includes an element (such as target element 488) that is a cross-site element (which bypasses many conventional CSRF protections).

When the communication 512 is received and parsed (for example), consumer 120 constructs (for example) a DOM 440 that determines the structure and function of window 486. The DOM 440 is rendered and the results are sent via communication 513 to user interface 480 for display in window 486. Window 486 includes a target element 488 that is arranged to initiate a network transaction when the user clicks on the target element 488. However, malicious code 462 can hide an obscured element (such as malicious code element 492, which also can be a cross-site reference) that is designed to be not noticed by the user and to misdirect any click made by the user (for example, the malicious code element 492 can be arranged to follow the movement of the cursor 490 and thus make it much more likely that the malicious code element 492 will be clicked).

The user at user interface 480 (who might not be able to notice the obscured malicious code element 492) positions, for example, the cursor 490 over the target element 488 via cursor positioning command 514. At that time, a user at user interface 480 clicks on the target element 488 by generating a click command 516, ostensibly for the purpose of navigating to the webpage implicated by target element 488. However, the malicious code element 492 is able to misdirect the click command 516 because the malicious code element 492 is interposed in a layer that is between the cursor 490 and the target element 488. In response to the click command 516 being generated, the clickjacking protector 430 is notified of the click command in operation 518.

In response to the clickjacking protector 430 being notified of the click command in operation 518, the clickjacking protector 430 notifies (in operation 520) the layer manager 474 of the click command and the coordinates of the click position. The clickjacking protector can notify also notify the network-enable interface not to permit any cross-site transactions, for example, until receiving permission from the clickjacking protector 430. (Typically, the permission—if any—is granted after the click has been evaluated by the layer manager 474.)

Layer manager 474 determines the order of the layers of the elements to determine, what elements exist in the area in a click occurs, and whether those elements are visible or otherwise obscured when rendered. In operation 522, the layer manager 474 notifies the clickjacking protector 430 that the click position is associated with an obscured element (which is thus potentially a malicious code element 492).

In operation 524, the network-enabled application 432 is notified that the click position is associated with an obscured element, whereupon the network-enabled application takes protective action(s) such as selectively querying the user (as in communication 525), accessing a security service (such as security service 466), and/or blocking the click transaction as described above. Accordingly, when malicious code element 492 (installed by malicious code 462, for example) on consumer 120 tries to signal the network-enabled application 432 in operation 526 of the user-generated click on the malicious code element 492, the network-enabled application 432 (being signaled that the an obscured element has been clicked upon) selectively blocks the attempted operation 528 of contacting the third party resource provider 160. Thus, the malicious code 462 is unable to initiate a communication 528 directed to the third party resource provider 160b or other points that are unknown and/or distrusted.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method of protecting against clickjacking in an electronic system, comprising:
determining whether a user selection signal position initiates a malicious code element rendered from a networked communication comprising a header that includes a clickjack protection enable command that enables cross-domain links to be selectively accessed and prohibits a cross-domain request from being included by any cross-domain site unless a cross-domain response includes a command that indicates a cross-domain name is allowed to be included in a cross-domain request, wherein the cross-domain name is the name of the domain or subdomain from which the cross-domain request originates; and
selectively blocking clicks to cross-domain sites that are linked-to by the malicious code element initiated by the user selection signal, in a device of the electronic system, in response to the determination that the user selection signal position initiates the malicious code element when the clickjack protection is enabled.

2. The method of claim 1, wherein the determining whether the user selection signal position initiates the malicious code element is made by evaluating an order of a layering of elements that are rendered to overlap the user selection signal position.

3. The method of claim 2, wherein the determining whether the user selection signal position initiates the malicious code element is made in response to a click command.

4. The method of claim 2, wherein the determining whether the user selection signal position initiates the malicious code element is made in response to a timing event or user-initiated actions.

5. The method of claim 4, wherein the malicious code element initiated by the click position includes a cross-site element.

6. The method of claim 5, wherein the malicious code element initiated by the user selection signal position is obscured by the cursor image.

7. The method of claim 5, wherein determining whether a user selection signal position initiates a malicious code element is made by determining whether a transparency of the malicious code element initiated by the user selection signal ranges from an invisible value to an opaque value.

8. The method of claim 7, wherein any malicious code element initiated by the user selection signal position includes malicious code.

9. The method of claim 8, comprising comparing a link associated with an malicious code element initiated by the user selection signal position with a list of sites known to contain malicious code.

10. A non-transitory medium including instructions that, when executed on a processor of an electronic system, protect against clickjacking in an electronic system, comprising:
determining whether any element initiated by a user selection signal position is a malicious code element rendered from a networked communication comprising a header that includes a clickjack protection enable command that enables cross-domain links to be selectively accessed and prohibits a cross-domain request from being included by any cross-domain site unless a cross-domain response includes a command that indicates a cross-domain name is allowed to be included in a cross-domain request, wherein the cross-domain name is the name of the domain or subdomain from which the cross-domain request originates; and selectively blocking clicks to cross-domain sites that are linked-to by the malicious code element initiated by the user selection signal in response to the determination that the user selection signal position initiates the malicious code element.

11. The medium of claim 10, wherein the determining whether any element initiated by the user selection signal position is obscured is made by evaluating an order of a layering of elements that are rendered to overlap the user selection signal position.

12. The medium of claim 10, wherein the determining whether any element initiated by the user selection signal position is obscured is made in response to the click command.

13. A web browsing system, comprising:
a network-enabled application of a consumer machine that is arranged to receive a communication from a networked service provider that describes the structure and functionality of content of the communication that is received by the content user element and that includes a clickjack protection enable command that enables cross-domain links to be selectively accessed and prohibits a cross-domain request from being included by any cross-domain site unless a cross-domain response includes a command that indicates a cross-domain name is allowed to be included in a cross-domain request, wherein the cross-domain name is the name of the domain or subdomain from which the cross-domain request originates;
a processor for executing functions of a layer manager for accessing a list of layered elements associated with the communication from the networked service provider and for determining whether any element of the received communication that is initiated by a user selection signal position is obscured; and
a processor for executing functions of a clickjacking protector for generating a protective response in response to a determination from the layer manager that an element initiated by the user selection signal position is a malicious code element, wherein the protective response selectively blocks commands initiated by the user selection signal that attempt to access cross-domain sites that are linked-to by any malicious code element initiated by the user selection signal position.

14. The system of claim 13, wherein the protective action is a generating of a warning signal that is internal to the consumer machine.

15. The system of claim 13, wherein the protective action is a generating of warning signal that is conveyed to networked services provider that provided the received communication.

16. The system of claim 13, wherein the determining whether any element initiated by the user selection signal position is obscured is made by evaluating an order of a layering of elements that are rendered to overlap the click position.

* * * * *